United States Patent
Ma et al.

(10) Patent No.: US 7,984,377 B2
(45) Date of Patent: Jul. 19, 2011

(54) CASCADED DISPLAY OF VIDEO MEDIA

(75) Inventors: Jeffrey Ma, Redwood City, CA (US); Rainer Brodersen, San Jose, CA (US); Rachel Clare Goldeen, Mountain View, CA (US); Mihnea Calin Pacurariu, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 958 days.

(21) Appl. No.: 11/530,665

(22) Filed: Sep. 11, 2006

(65) Prior Publication Data
US 2008/0062894 A1 Mar. 13, 2008

(51) Int. Cl.
*G06F 3/00* (2006.01)

(52) U.S. Cl. ......... 715/719; 715/720; 715/723; 715/726

(58) Field of Classification Search .................. 715/719, 715/720, 723, 726
See application file for complete search history.

(56) References Cited

U.S. PATENT DOCUMENTS

| | | | |
|---|---|---|---|
| 5,619,249 A | 4/1997 | Billock et al. | |
| 5,717,879 A | 2/1998 | Moran et al. | |
| 5,822,123 A | 10/1998 | Davis et al. | |
| 5,880,768 A | 3/1999 | Lemmons et al. | |
| 6,006,227 A | 12/1999 | Freeman et al. | |
| 6,198,483 B1* | 3/2001 | Launais | 715/848 |
| 6,335,737 B1 | 1/2002 | Grossman et al. | |
| 6,448,987 B1 | 9/2002 | Easty et al. | |
| 6,638,313 B1 | 10/2003 | Freeman et al. | |
| 6,725,427 B2 | 4/2004 | Freeman et al. | |
| 6,768,999 B2 | 7/2004 | Prager et al. | |
| 6,944,632 B2 | 9/2005 | Stern | |
| 7,292,243 B1* | 11/2007 | Burke | 345/440 |
| 7,362,331 B2 | 4/2008 | Ording | |
| 7,363,591 B2 | 4/2008 | Goldthwaite et al. | |
| 2002/0033848 A1* | 3/2002 | Sciammarella et al. | 345/838 |
| 2002/0083469 A1 | 6/2002 | Jeannine et al. | |
| 2002/0087431 A1* | 7/2002 | Morishima | 705/26 |
| 2002/0175931 A1 | 11/2002 | Holtz et al. | |
| 2003/0110450 A1 | 6/2003 | Sakai | |
| 2003/0117425 A1 | 6/2003 | O'Leary et al. | |
| 2003/0142751 A1 | 7/2003 | Hannuksela | |
| 2003/0174160 A1 | 9/2003 | Deutscher et al. | |
| 2004/0008211 A1 | 1/2004 | Soden et al. | |
| 2004/0100479 A1 | 5/2004 | Nakano et al. | |
| 2004/0140995 A1* | 7/2004 | Goldthwaite et al. | 345/716 |
| 2004/0150657 A1 | 8/2004 | Wittenburg et al. | |

(Continued)

FOREIGN PATENT DOCUMENTS

EP 1 469 375 A1 10/2004

(Continued)

OTHER PUBLICATIONS

U.S. Appl. No. 11/530,824, filed Sep. 11, 2006, Madden et al.

(Continued)

*Primary Examiner* — Weilun Lo
*Assistant Examiner* — Shashi K Becker
(74) *Attorney, Agent, or Firm* — Fish & Richardson P.C.

(57) ABSTRACT

Systems and methods for presenting media items in a display environment. A plurality of media items are selected. Instances of each of the selected media items are generated. The instances of the selected media items can be scaled and concurrently transitioned through a display environment along one or more paths.

18 Claims, 5 Drawing Sheets

U.S. PATENT DOCUMENTS

| | | |
|---|---|---|
| 2004/0261031 A1 | 12/2004 | Tuomainen et al. |
| 2005/0041033 A1 | 2/2005 | Hilts |
| 2005/0044499 A1 | 2/2005 | Allen et al. |
| 2005/0091597 A1 | 4/2005 | Ackley |
| 2005/0160375 A1 | 7/2005 | Sciammarella et al. |
| 2005/0246654 A1 | 11/2005 | Hally et al. |
| 2005/0278656 A1 | 12/2005 | Goldthwaite et al. |
| 2006/0020962 A1 | 1/2006 | Stark et al. |
| 2006/0031776 A1 | 2/2006 | Glein et al. |
| 2006/0265409 A1 | 11/2006 | Neumann et al. |
| 2007/0162853 A1 | 7/2007 | Weber et al. |
| 2007/0288863 A1 | 12/2007 | Ording et al. |
| 2008/0065638 A1 | 3/2008 | Brodersen et al. |
| 2008/0065720 A1 | 3/2008 | Brodersen et al. |
| 2008/0066010 A1 | 3/2008 | Brodersen et al. |
| 2008/0066013 A1 | 3/2008 | Brodersen et al. |
| 2008/0066110 A1 | 3/2008 | Brodersen et al. |
| 2008/0092168 A1 | 4/2008 | Logan et al. |
| 2008/0122870 A1 | 5/2008 | Brodersen et al. |

FOREIGN PATENT DOCUMENTS

| | | |
|---|---|---|
| EP | 1 510 911 A2 | 3/2005 |

OTHER PUBLICATIONS 7.0" Widescreen Digital Photo Frame. Product information [online]. Westinghouse Digital Electronics, 2005 [retrieved on Sep. 5, 2006]. Retrieved from the Internet: <URL: http://www.westinghousedigital.com/pc-58-6-70-widescreen-digital-photo-frame.aspx>.

"Fading Image Rollovers," http://web.archive.org/web/20060111080357/http://www.javascript-fx.com/fade_rollovers/general_help/help.html. Jan. 11, 2006, 1 page.

"Animated Image Blur," http://web.archive.org/web/20060430062528/http://www.tutorio.com/tutorial/animated-image-blur, Apr. 30, 2006, 2 pages.

* cited by examiner

CASCADED DISPLAY OF VIDEO MEDIA

BACKGROUND

This disclosure is related to media processing systems and methods.

Media devices, such as digital video and audio players, can include multiple functions and capabilities, such as playing stored content, browsing and selecting from recorded content, storing and/or receiving content selected by a user, and the like. These various functions can often be grouped according to content types, e.g., movies, music, television programs, photos, etc.

SUMMARY

Disclosed herein are systems and methods for presenting media items in an interface environment. In some implementations, a display environment includes a plurality of representations of at least one media item. The plurality of representations are configured to sequentially transition through the display environment. The sequential transition of the plurality of representations of the media items generates the appearance of movement among the plurality items. In some implementations, the plurality of representation of the media items are differently scaled versions of the media item representations.

In other implementations, instructions stored on computer readable media are used to cause a processor to perform the operations comprising: selecting a plurality of video items; generating instances for each of the selected video items; and concurrently transitioning the instances of the video items through the display environment along one or more paths.

In another implementation, a system includes a display generation module, a data store, and an active picture output generator. The display generation engine is executable by a processing device, and configured to provide an active picture output for a user, the active picture output comprising a plurality of media instances comprising a picture. An active picture output generator is configured to retrieve a picture from the data store and to provide the active picture output to the display generation module. The active picture output is generated by the active picture output generator so as to provide an appearance of movement among the media instances based upon sequential output from the active picture output generator.

DETAILED DESCRIPTION

Figure 1:
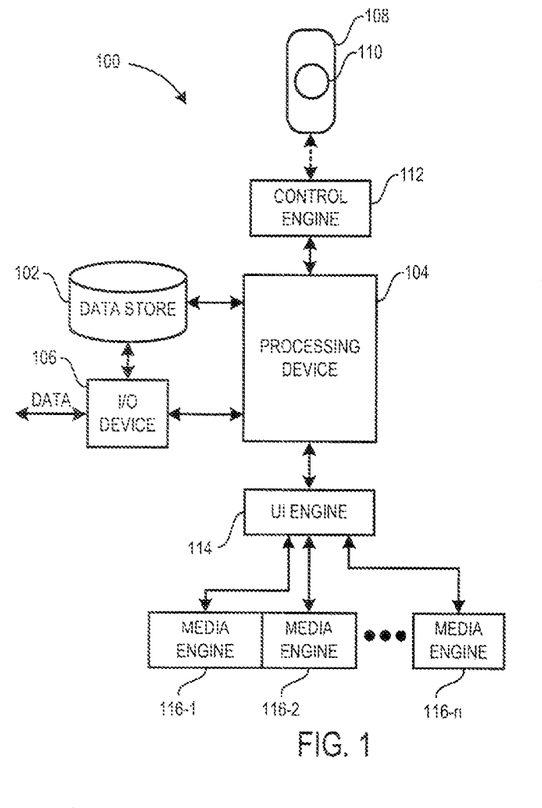
FIG. 1 is a block diagram of an example media processing system.

FIG. 1 is a block diagram of an example media processing system 100. The media processing system 100 can transmit and receive media data and data related to the media data. The media data can be stored in a data store 102, such as a memory device, and be processed by a processing device 104 for output on a display device, such as a television, a computer monitor, a game console, a hand held portable device, and the like, and/or an audio device, such as a multi-channel sound system, a portable media player, a computer system, and the like. The media processing system 100 may be used to process media data, for example, video data and audio data received over one or more networks by an input/output (I/O) device 106. Such media data may include metadata, e.g., song information related to audio data received, or programming information related to a television program received.

The media data and related metadata may be provided by a single provider, or may be provided by separate providers. In one implementation, the media processing system 100 can be configured to receive media data from a first provider over a first network, such as a cable network, and receive metadata related to the video data from a second provider over a second network, such as a wide area network (WAN). Example media data include video data, audio data, content payload data, or other data conveying audio, textual and/or video data.

In another implementation, the media processing system 100 can be configured to receive media data and metadata from a computing device, such as a personal computer. In one example of this implementation, a user manages one or more media access accounts with one or more content providers through the personal computer. For example, a user may manage a personal iTunes® account with iTunes® software, available from Apple Computer, Inc. Media data, such as audio and video media data, can be purchased by the user and stored on the user's personal computer and/or one or more data stores. The media data and metadata stored on the personal computer and/or the one or more data stores can be selectively pushed and/or pulled for storage in the data store 102 of the media processing system 100.

In another implementation, the media processing system 100 can be used to process media data stored in several data stores in communication with a network, such as wired and/or wireless local area network (LAN), for example. In one implementation, the media processing system 100 can pull and/or receive pushed media data and metadata from the data stores over the network for presentation to a user. For example, the media processing system 100 may be implemented as part of an audio and video entertainment center having a video display device and an audio output device, and can pull media data and receive pushed media data from one or more data stores for storage and processing. At the entertainment center, a user can, for example, view photographs that are stored on a first computer while listening to music files that are stored on a second computer.

In one implementation, the media processing system 100 includes a remote control device 108. The remote control device 108 can include a rotational input device 110 configured to sense touch actuations and generate remote control signals therefrom. The touch actuations can include rotational actuations, such as when a user touches the rotational input device 110 with a digit and rotates the digit on the surface of the rotational input device 110. The touch actuations can also include click actuations, such as when a user presses on the rotational input device 110 with enough pressure to cause the remote control device 108 to sense a click actuation.

In one implementation, the functionality of the media processing system 100 is distributed across several engines. For example, the media processing system 100 may include a controller engine 112, a user interface (UI) engine 114, and one or more media engines 116-1, 116-2, and 116-n. The engines may be implemented in software as software modules or instructions, or may be implemented in hardware, or in a combination of software and hardware.

The control engine 112 is configured to communicate with the remote control device 108 by a link, such as a wireless infrared signal or radio frequency signal. The remote control device 108 can transmit remote control signals generated, for example, from touch actuations of the rotational input device 110 to the control engine 112 over the link. In response, the control engine 112 is configured to receive the remote control signals and generate control signals in response. The control signals are provided to the processing device 104 for processing.

The control signals generated by the control engine 112 and processed by the processing device 104 can invoke one or more of the UI engine 114 and media engines 116-1-116-n. In one implementation, the UI engine 114 manages a user interface to facilitate data presentation for the media engines 116-1-116-n and functional processing in response to user inputs.

In one implementation, the media engines 116 can include one or more content-specific engines, such as a movies engine, television program engine, music engine, and the like. Each engine 116 can be instantiated to support content-specific functional processing. For example, a movie engine to support movie-related functions can be instantiated by selecting a "Movies" menu item. Example movie-related functions include purchasing movies, viewing movie previews, viewing movies stored in a user library, and the like. Likewise, a music engine to support music-related functions can be instantiated by selecting a "Music" menu item. Example music-related functions include purchasing music, viewing music playlists, playing music stored in a user library, and the like.

The media processing system 100 of FIG. 1 can also implement different functional distribution architectures that have additional functional blocks or fewer functional blocks. For example, the engines 116 can be implemented in a single monolithic engine.

Figure 2:
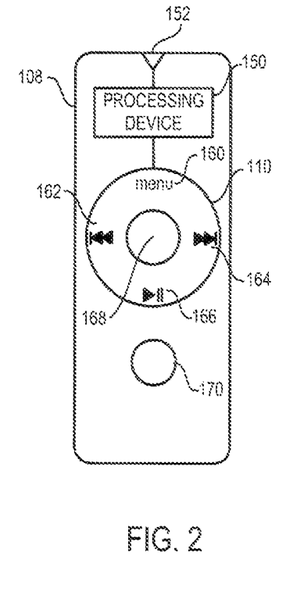
FIG. 2 is a block diagram of an example remote control device for the media processing system.

FIG. 2 is a block diagram of an example remote control device 108 for the media processing system 100. The remote control device 108 includes a rotational input device 110, a processing device 150, and a wireless communication subsystem 152. The rotational input device 110 defines a surface that can sense a touch actuation, such as the presence of a finger on the surface, and can further generate a control signal based on a rotation of the finger on the surface. In one implementation, a touch sensitive array is disposed beneath the surface of the rotational input device 110. The touch sensitive array can be disposed according to polar coordinates, i.e., r and θ, or can be disposed according to Cartesian coordinates, i.e., x and y.

The rotational input device areas 160, 162, 164, 166 and 168 are receptive to press actuations. In one implementation, the areas include a menu area 160, a reverse/previous area 162, a play/pause area 164, a forward/next area 166, and a select area 168. The areas 160-168, in addition to generating signals related to their descriptive functionalities, can also generate signals for context-dependent functionality. For example, the menu area 160 can generate signals to support the functionality of dismissing an onscreen user interface, and the play/pause area 164 can generate signals to support the function of drilling down into a hierarchal user interface. In one implementation, the areas 160-168 comprise buttons disposed beneath the surface of the rotational input device 110. In another implementation, the areas 160-168 comprise pressure sensitive actuators disposed beneath the surface of the rotational input device 110.

The processing device 150 is configured to receive the signals generated by the rotational input device 110 and generate corresponding remote control signals in response. The remote control signals can be provided to the communication subsystem 152, which can wirelessly transmit the remote control signals to the media processing system 100.

Although shown as comprising a circular surface, in another implementation, the rotational input device 110 can comprise a rectangular surface, a square surface, or some other shaped surface. Other surface geometries that accommodate pressure sensitive areas and that can sense touch actuations may also be used, e.g., an oblong area, an octagonal area, etc.

Other actuation area configurations may also be used. For example, in another implementation, the remote control device 108 can also include a separate actuation button 170. In this implementation, the areas comprise a "+" or increase area 160, a reverse/previous area 162, a "−" or decrease area 164, a forward/next area 166, a play/pause area 168, and a menu area 170.

Figure 3:
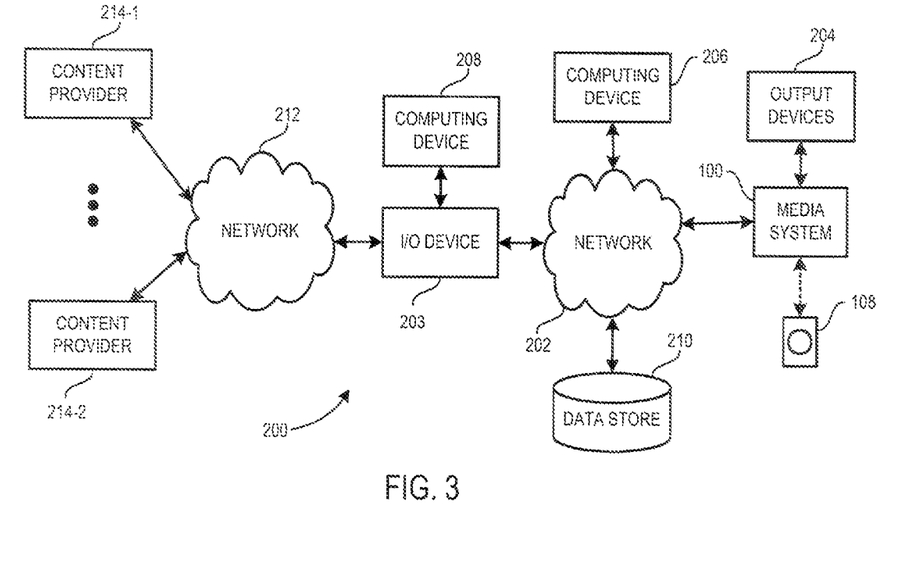
FIG. 3 is an example network environment in which a media processing system in accordance with FIG. 1 can be implemented.

FIG. 3 is an example network environment 200 in which a media processing system 100 in accordance with FIG. 1 may be implemented. The media processing system 100 receives, for example, user input through a remote control device 108 and media data over a network 202, such as a wired or wireless LAN. In one implementation, the network 202 communicates with a wide area network 212, such as the Internet, through an I/O device 203, such as a router, server, cable modem, or other computing and/or communication processing device. The media processing system 100 processes the media data for output to one or more output devices 204. The media processing system 100 can receive the media data from one or more data stores connected to the network 202, such as computing devices 206 and 208, and a data store 210.

The media data can be received through the network 212 by one of the computing devices, such as computing device 208. The network 212 can include one or more wired and wireless networks, such as the Internet. The media data is provided by one or more content providers 214. For example, the content provider 214-1 may provide media data that is processed by the media processing system 100 and output through the output devices 206, and the content provider 214-2 may provide metadata related to the media data for processing by the media processing system 100. Such metadata may include episodic content, artist information, and the like. A content provider 214 can also provide both media data and related metadata.

In one implementation, the media processing system 100 can also communicate with one or more content providers 214 directly. For example, the media processing system 100 can communicate with the content providers the wireless network 202, the I/O device 203, and the network 212. The media processing system 100 can also communicate with the content providers 214 thorough other network configuration, e.g., through a direct connection to a cable modem, through a router, or through one or more other communication devices. Example communications can include receiving sales information, preview information, or communications related to commercial transactions, such as purchasing audio files and video files.

In another implementation, the media processing system 100 can receive content from any of the computing devices 206 and 208, and other such computing devices or data stores 210 available on the network 202 through sharing. Thus, if any one or more of the computing devices or data stores are unavailable, media data and/or meta data one the remaining computing devices or other such computing devices or data stores can still be accessed.

Figure 4:
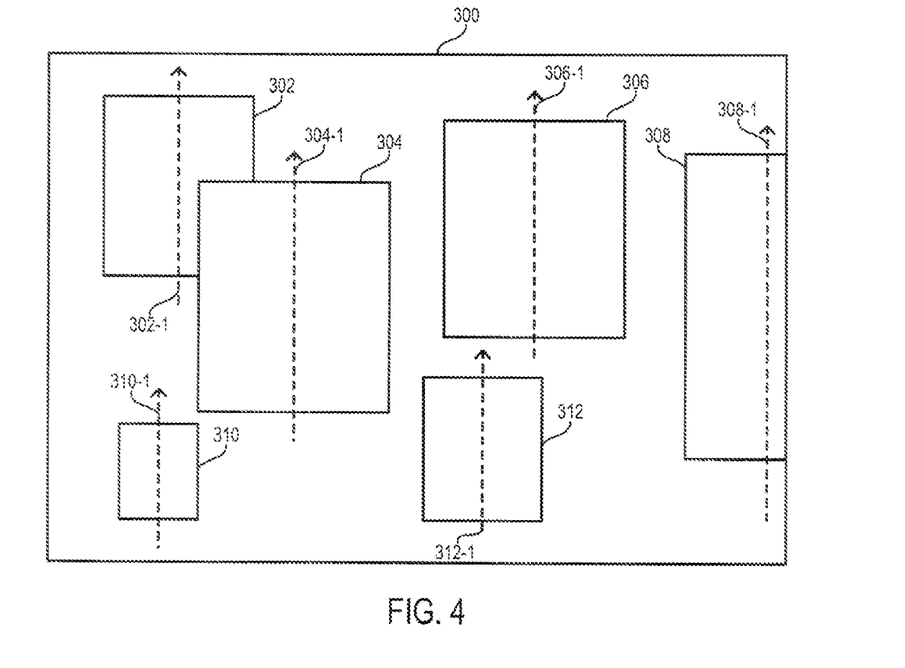
FIGS. 4-7 are block diagrams of example transitions of media items through the display environment.

FIG. 4 is a block diagram of an example transition of media items 302-312 (e.g., video items) through the display environment 300. The media items 302-312 transitions through the display environment 300 along respective paths 302-1, 304-1, 306-1, 308-1, 310-1, 312-1. The transitioning of the media items 302-312 can provide the appearance of movement in a vertical direction. In one example, the movement can be an upward direction. In other examples, the movement can be in a downward direction. In further examples, the movement of different media items can be in different directions (e.g., both up and down).

In some implementations, the media items 302-312 can include digital representations of photographs, video clips, movies, promotional media, or combinations thereof. In some implementations, the media items 302-312 can be retrieved from among media items stored in the data store 102 of FIG. 1. A media engine can generate instances of the media items 302-312 and scale the instances to fit within the display environment. Another media engine can transition the instances of the media items 302-312 through the display environment 300. In some examples, the media engines performing the generation, scaling and transitioning of the instances can be combined into a single media engine.

Moreover, once an instance of a media item 302-312 transitions through and exits from the display environment 300, a new media item can be retrieved from the data store 102 to replace the exiting media item 302-312. An instance for the new media item can be generated and transitioned on and through the display environment 300. In some example implementations, the number of instances of media items 302-312 in the display environment 300 can be variable. For example, the number of instances of media items 302-312 can vary based upon user preferences (e.g., input through a user interface engine). Alternatively, the number of instances of media items 302-312 can vary quasi-randomly. Furthermore, in some examples, it is not necessary that an instance exit the display environment 300 before another instance of a media item enters the display environment 300. In these display environments 300 the instances of media can be randomly transitioned into the display environment 300. A pre-set limit (e.g., user defined, program defined, etc.) can define an upper limit to the number of instances displayed within the display environment at a single time, the number of instances that appear on a single path, etc.

In some implementations, the instances of the media items can be quasi-randomly scaled to provide the appearance of depth to the display environment. The scaling of the instances of the media items can be maintained while the instances of media items are displayed in the display environment. Instances of new media items can be quasi-randomly scaled prior to being transitioned into the display environment 300. Further, in some implementations, media items can be scaled as they transition along a path, e.g., changing scale as they change position along the path.

In further implementations, the instances of media items may be selectable by the user. For example, the user can select media item instance 310 by clicking on the instance using an input device (e.g., a mouse pointer representation). Media item instance 310 can then be enlarged, thereby providing a better view of the selected media item, while maintaining the transitioning of the media item instances through the display environment.

Figure 5:
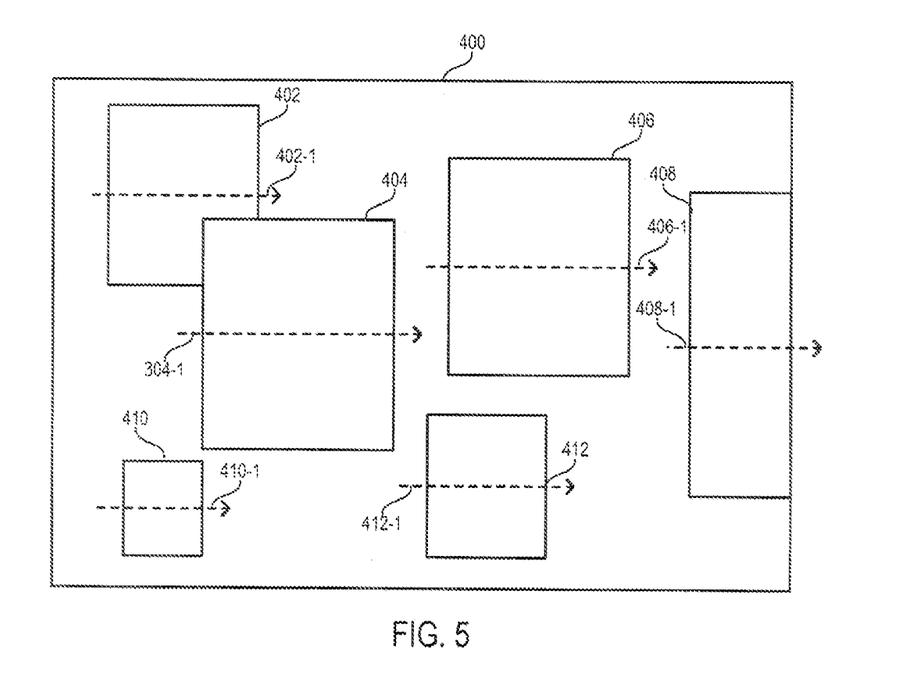

FIG. 5 is a block diagram of another example transition of media items 402-412 (e.g., video items) through the display environment 400. The media items 402-412 transition through the display environment 400 along respective paths 402-1, 404-1, 406-1, 408-1, 410-1, 412-1. The transitioning of the media items 402-412 can provide the appearance of movement in a horizontal direction. In one example, the movement can be a rightward direction. In other examples, the movement can be in a leftward direction. In further examples, the movement of different media items can be in different directions (e.g., both left and right).

As discussed above, instances of the media instances 402-412 can be generated and scaled for display in a display environment 400. In some implementations, the scaling of the instances can be quasi-random, to provide the appearance of depth to the display environment 400. Moreover, as various instances of the media items 402-412 transition out of the display environment 400, replacement media items can be selected to replace any of the media items transitioning out of the display environment 400. In some example implementations, the number of instances of media items 302-312 in the display environment 300 can be variable. In such instances, the number of instances of media items 302-312 can vary based upon user preferences (e.g., input through a user interface engine). Alternatively, the number of instances of media items 302-312 can vary quasi-randomly. Furthermore, in some examples, it is not necessary that an instance exit the display environment 300 before another instance of a media item enters the display environment 300. In these display environments 300 the instances of media can be randomly transitioned into the display environment 300. A pre-set limit (e.g., user defined, program defined, etc.) can define an upper limit to the number of instances displayed within the display environment at a single time.

Figure 6:
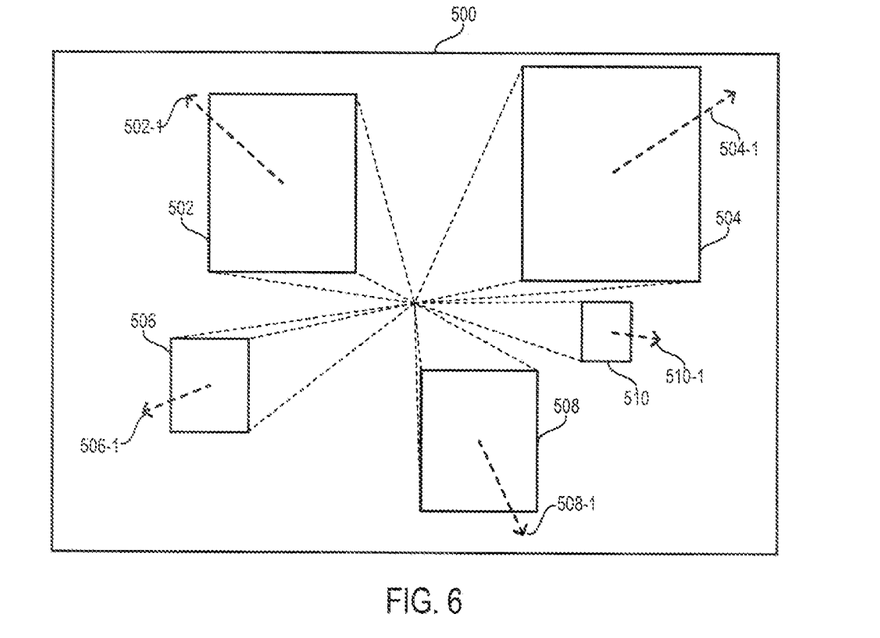

FIG. 6 is a block diagram of another example transition of media items 502-510 (e.g., video items) through the display environment 500. The media items 502-510 transition through the display environment 500 along respective paths 502-1, 504-1, 506-1, 508-1, 510-1. The transitioning of the media items 502-510 can provide the appearance of movement along a path originating from a vanishing point, which, in conjunction with increasing or decreasing the scaling of an instance of the media items, provides the appearance of movement along a three dimensional path. In one example, the media items can appear to move in an oncoming direction through the display environment 500. In other examples, the media items can appear to move away from the user through the display environment 500. In further examples, the movement of different media items can be in different directions (e.g., both oncoming and exiting).

As discussed above, instances of the media instances 502-510 can be generated and scaled for display in a display environment 500. Moreover, as various instances of the media items 502-510 transition out of the display environment 500, replacement media items can be selected to replace any of the media items transitioning out of the display environment 500.

In some example implementations, transitioning the instances of media items forward in the display environment can include intermittent pauses. The intermittent pauses can allow the user to view the instances of media items in a foreground position for a period of time before continuing to transition a next layer of media item instances forward to the foreground position.

For example, in some implementations there can be several layers of instances of digital photos. The first layer can correspond, for example, to a foreground position, while the second and third through n-th layers can correspond, for example, to increasingly smaller scale photographs. The transitioning would pause for a period of time having the first layer in the foreground position. After expiration of a period of time, the first layer can transition out of the display environment and the second layer can transition into a foreground position, while the third through n-th layers are transitioned to the next larger scale (e.g., the original scale of the second layer digital photos). The display environment can display the second layer in the foreground position for a period of time, and then continue to successively transition the third through n-th layers through the foreground position, with foreground pauses for each successive layer. Moreover, in implementations where there are numerous layers, for example, the n-th layer might not initially appear in the display environment. In various implementations, the display environment can be limited by the programmer or the user to displaying 4 levels of images. In these implementations, each successive transition of a layer out of the display environment can be complemented by a new layer transitioning into the display environment.

Figure 7:
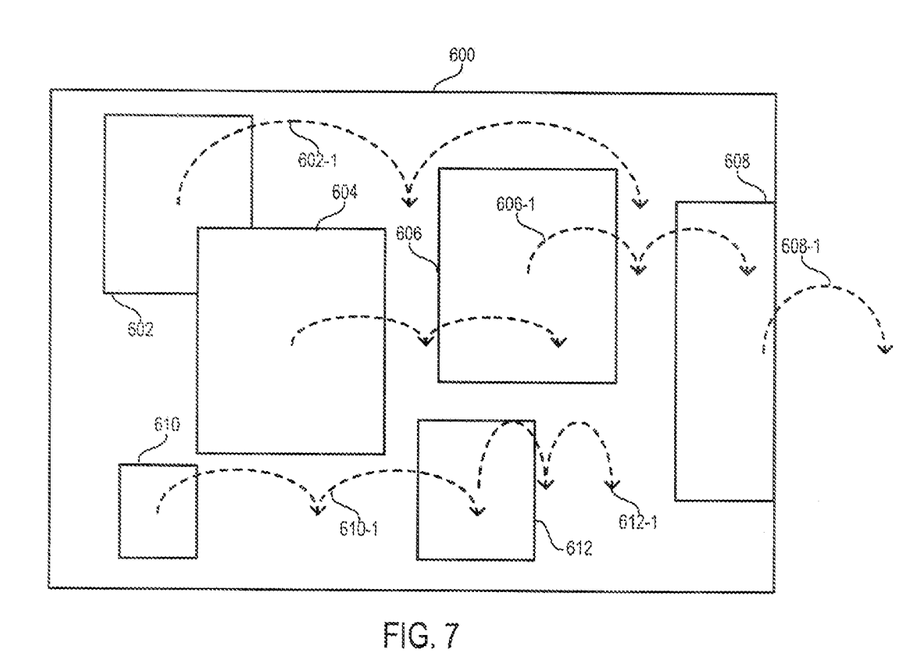

FIG. 7 is a block diagram of another example transition of media items 602-612 (e.g., video items) through the display environment 600. The media items 602-612 transition through the display environment 300 along their respective paths 602-1, 604-1, 606-1, 608-1, 610-1, 612-1. The transitioning of the media items 602-612 can provide the appearance of the media items bouncing across the screen. In one example, the bouncing movement can be a rightward direction. In other examples, the bouncing movement can be in a leftward direction. In further examples, the bouncing movement of different media items can be in different directions (e.g., both left and right).

As discussed above, instances of the media instances 602-612 can be generated and scaled for display in a display environment 600. In some implementations, the scaling of the instances can be quasi-random, to provide the appearance of depth to the display environment 600. Moreover, the height or amplitude and/or the length associated with the bouncing movement can be quasi-random, or controlled by input received from the user. Further, as various instances of the media items 602-612 transition out of the display environment 600, replacement media items can be selected to replace any of the media items transitioning out of the display environment 600. In various other examples, the paths of movement can be a quasi-random linear path or any other type of path.

Furthermore, in some implementations of the display environment, the display environment can be configured to use any of the aforementioned transitions in combination with any other transitions. For example, the upward/downward transition shown in FIG. 4 can be combined with the zoom-in/zoom-out transition described with respect to FIG. 6. Thus, while instances of media items are transitioning upward, the instances of media items can, for example, periodically zoom forward to display a next layer of photos in a foreground position. Other implementations of transitions and combinations of transitions are also possible.

Figure 8:
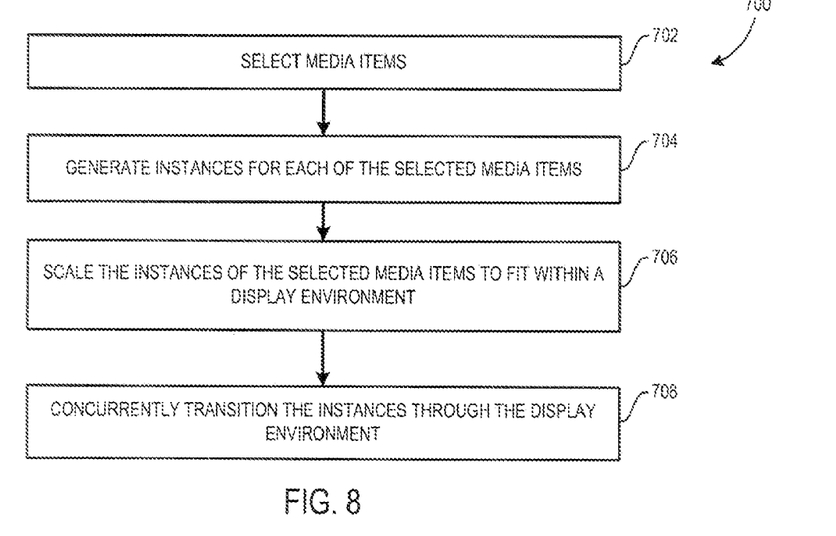
FIGS. 8-10 are flow diagrams of an example media viewer.

FIG. 8 is a flow diagram 700 of an example process for viewing media, in for example a media viewer. Media items are selected in step 702. For example, media items can be quasi-randomly selected by a corresponding media engine 116-1, 116-2, 116-n (e.g., a media selection engine configured to select media items from a data store 102 of FIG. 1). Alternatively, the media items can be selected based upon input received from the user through a user interface 114 of FIG. 1. In yet a further example, the media items can be remotely located and selected using a network The media items in various examples can include digital representations of pictures (e.g. photographs), video clips, movie clips, promotional media (e.g., movie poster, album cover, etc.). In some implementations, the movie clips can be supplemented by associated promotional media (e.g., a movie poster), thereby enabling the user to obtain information about the movie clip.

In step 704, instances for each of the selected media items are generated. For example, the instances of the selected media items can be generated by a corresponding media engine 116-1, 116-2, 116-n (e.g., a presentation engine configured to receive data and render graphics to a display device).

Optionally, in step 706, the instances of the media items are scaled. For example, the instances of the media items can be scaled by a corresponding media engine 116-1, 116-2, 116-n (e.g., a presentation engine). The instances of the media items can be scaled such that the media items fit within a display environment. In some examples, the display environment can include, among others, a screen saver, a media presentation, a slideshow viewer, a library player, or an audio player. Scaling can also be used to give the appearance of depth or emphasis as desired. Scaling can occur prior to rendering the media item a first time or as the item is transitioned along a path in the display environment.

In step 708, the instances of the media items can be concurrently transitioned through the display environment. For example, the instances of the selected media items can be transitioned by a corresponding media engine 116-1, 116-2, 116-n (e.g., a presentation engine). The instances of the media items can be transitioned using sequential refreshing of the instances in slightly different locations, thereby providing the appearance to a user of movement (e.g., linear movement) along a path through the display environment.

Moreover, the instances of media items can be transitioned at different rates. Transitioning the instances of media items at different rates, can add to the appearance of depth to the display environment. For example, items that are scaled larger can be transitioned at a faster rate than items that are scaled smaller. The rate of transition for a media item that can be linearly proportional to the scaled size of the media item. Thus, small items can have a slower transition rate, while larger items can have a faster transition rate. Transitioning the media items at different rates can also help to prevent a larger item from covering a smaller item as both of the items transition through the display environment.

Further paths which different media items use to transition through the display environment can intersect with each other in some examples. In some implementations, when paths of the media item instances intersect, an instance which is scaled larger can take precedence (e.g., the larger instance can be drawn on top of the smaller instance).

Figure 9:
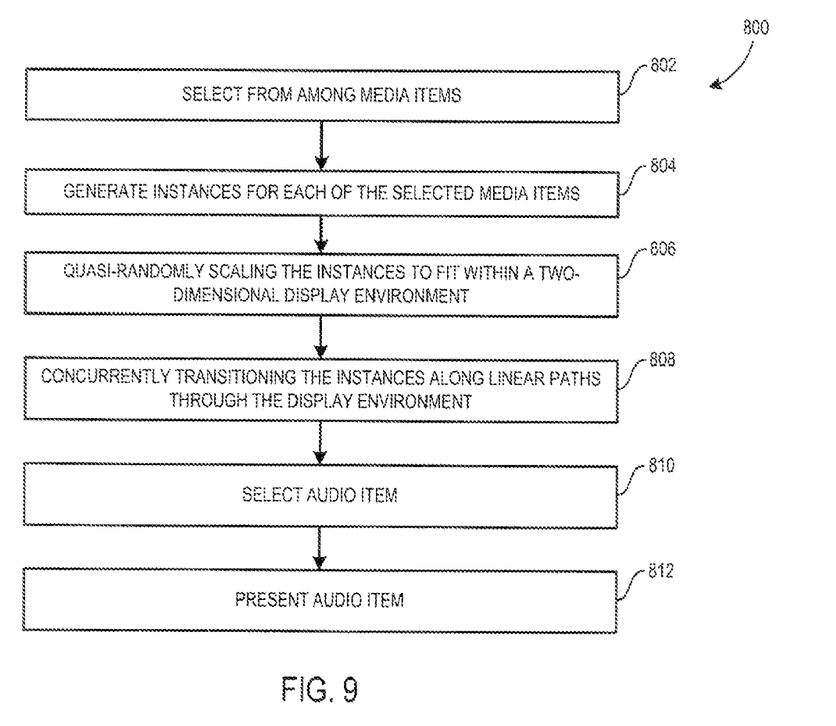

FIG. 9 is another flow diagram of an example media viewing process. In step 802, a selection is made from among media items. For example, media items can be quasi-randomly selected by a corresponding media engine (e.g., media selection engine configured to quasi-randomly select media items from a data store 102 or a network interface). Alternatively, the media items can be selected based upon input received from the user through a user interface 114 of FIG. 1. In yet further examples, the media can be remotely located and selected using a network The media items in various examples can include digital representations of pictures (e.g. photographs), video clips, movie clips, promotional media (e.g., movie poster, album cover, etc.). In some implementations, the movie clips can be supplemented by associated promotional media (e.g., a movie poster), thereby enabling the user to obtain information about the movie clip.

In step 804, instances for each of the selected media items are generated. For example, the instances of the selected media items can be generated by a corresponding media engine 116-1, 116-2, 116-n (e.g., a presentation engine).

Optionally, in step 806, the instances of the media items are quasi-randomly scaled. For example, the instances of the media items can be quasi-randomly scaled by a corresponding media engine 116-1, 116-2, 116-*n* (e.g., a presentation engine). The instances of the media items can be scaled such that the media items fit within a display environment. In some examples, the display environment can include, among others, a screen saver, a media presentation, a slideshow viewer, a library player, or an audio player.

In step 808, the media viewer concurrently transitions the instances of the media items along linear paths through the display environment. For example, the instances of the selected media items can be transitioned through the display environment by a corresponding media engine 116-1, 116-2, 116-*n* (e.g., a presentation engine). The instances of the media items can be transitioned using sequential refreshing of the instances in slightly different locations, thereby providing the appearance to a user of movement (e.g., linear movement) along a path through the display environment.

In step 810, an audio item is selected. The audio item can be selected, for example, based upon user input received through the user interface 114 of FIG. 1. Alternatively, the audio item may be quasi-randomly selected from an audio library by an audio selection engine from among the media engines 116-1, 116-2, 116-*n*, the audio selection engine being configured to enable the user to select audio content or being configured to quasi-randomly select audio content.

In step 812, the audio item is presented. Alternatively, the audio item may be presented using an audio interface engine selected from among the media engines 116-1, 116-2, 116-*n*, the audio interface engine being configured to generate audio signals suitable for output to speakers based upon received data. In some implementations, the audio item can correspond to at least one of the media items from which a selection is made. For example, promotional media (e.g., album art) associated with the audio item can be mixed among the media items for selection in step 802. Thus, the display environment can present the promotional material, alerting the user to the audio that is playing.

Figure 10:
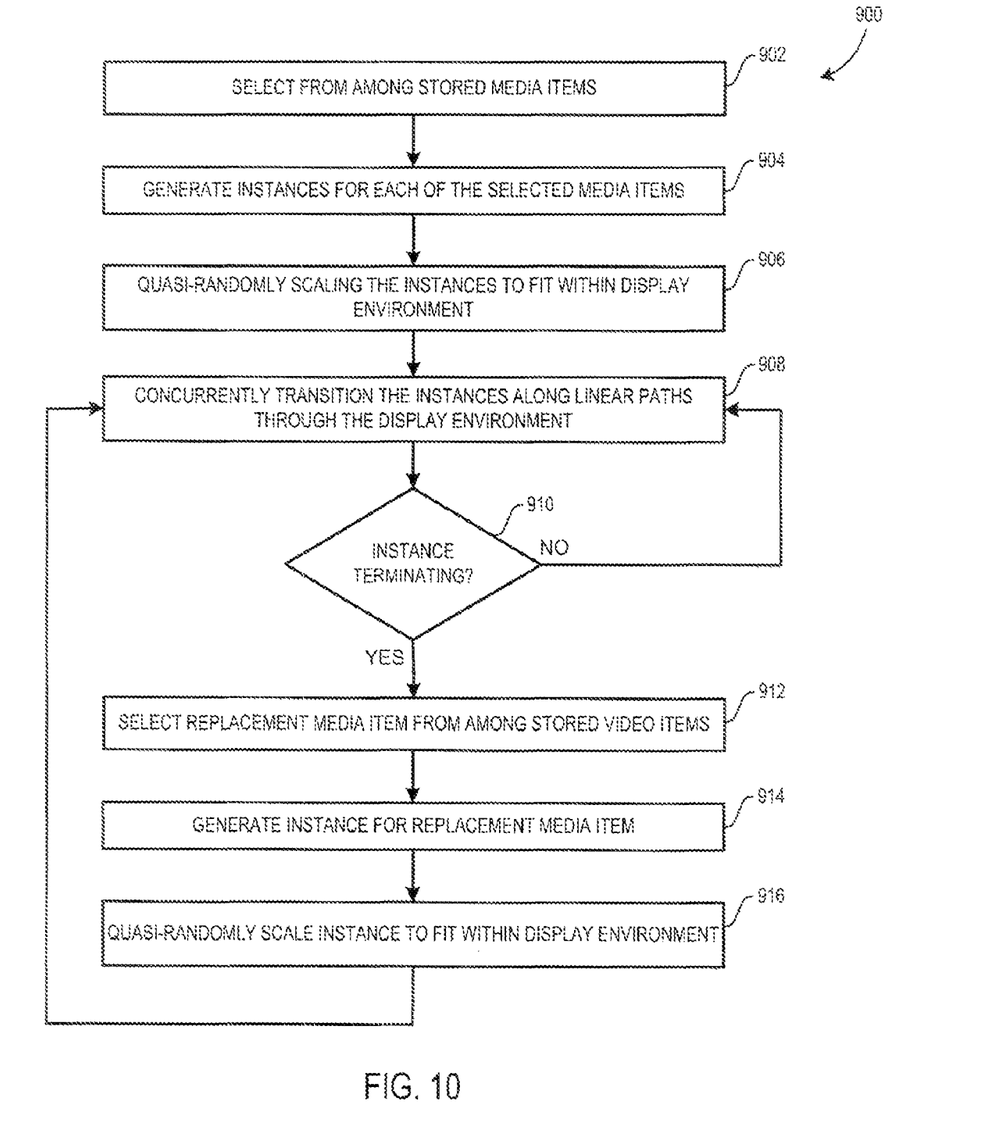

FIG. 10 is another flow diagram 900 of an example media viewing process. Media items are selected from among stored media items in step 902. For example, media items can be quasi-randomly selected by a corresponding media engine 116-1, 116-2, 116-*n* (e.g., a media selection engine configured to quasi-randomly select media items from a data store 102). Alternatively, the media items can be selected based upon input received from the user through a user interface 114 of FIG. 1. The media items in various examples can include digital representations of pictures (e.g. photographs), video clips, movie clips, promotional media (e.g., movie poster, album cover, etc.).

In step 904, the instances of each of the selected media items are generated. For example, the instances of the selected media items can be generated by a corresponding media engine 116-1, 116-2, 116-*n* (e.g., a presentation engine).

Optionally, in step 906, the instances of the media items are quasi-randomly scaled. For example, the instances of the media items can be quasi-randomly scaled by a corresponding media engine 116-1, 116-2, 116-*n* (e.g., a presentation engine). The instances of the media items can be quasi-randomly scaled such that the media items fit within a display environment. In some examples, the display environment can include, among others, a screen saver, a media presentation, a slideshow viewer, a library player, or an audio player.

In step 908, the instances of the media items are concurrently transitioned through the display environment. For example, the instances of the selected media items can be transitioned by a corresponding media engine 116-1, 116-2,
116-*n* (e.g., a presentation engine). The instances of the media items can be transitioned using sequential refreshing of the instances in slightly different locations, thereby providing the appearance to a user of movement (e.g., linear movement) along a path through the display environment.

Step 910 determines whether any of the instances of the media items are terminating from the display environment. As an example, step 910 can be performed by a corresponding media engine 116-1, 116-2, 116-*n* (e.g., presentation engine). When there are no instances of the media items that are terminating from the display environment, the instances of the media items continue to be transitioned through the display environment. When any of the instances of the media items are terminating from the display environment, replacement media items are selected in step 912. Replacement media items can be quasi-randomly selected by a media selection engine from a data store 102. Alternatively, the media items can be selected base upon input received from the user through a user interface 114 of FIG. 1. For example, termination can arise when a media item has transitioned to an end of path that is defined for the display environment (e.g., the media item is transitioned off the edge of the screen). Alternatively, a media item may be transitioned when a predetermined time out has expired (e.g., the media item is terminated after it has navigated the associated path a predetermined number of cycles or after a predetermined amount of time)

In step 914 instances for any replacement media items are generated. For example, the instances of the replacement media items can be generated by a corresponding media engine 116-1, 116-2, 116-*n* (e.g., a presentation engine).

Optionally, in step 916, the instances of any replacement media items are quasi-randomly scaled. For example, the instances of the replacement media items can be quasi-randomly scaled by a corresponding media engine 116-1, 116-2, 116-*n* (e.g., a presentation engine). Any instances of the replacement media items can be quasi-randomly scaled such that the media items fit within the display environment. The scaled instances of the replacement media items can be transitioned with other instances in step 908.

The apparatus, methods, flow diagrams, and structure block diagrams described in this patent document can be implemented in computer processing systems including program code comprising program instructions that are executable by the computer processing system. Other implementations can also be used. Additionally, the flow diagrams and structure block diagrams described in this patent document, which describe particular methods and/or corresponding acts in support of steps and corresponding functions in support of disclosed structural means, can also be utilized to implement corresponding software structures and algorithms, and equivalents thereof.

The apparatus, methods, flow diagrams, and structure block diagrams described in this patent document can be implemented in computer processing systems including program code comprising program instructions that are executable by the computer processing system. Other implementations can also be used. Additionally, the flow diagrams and structure block diagrams described in this patent document, which describe particular methods and/or corresponding acts in support of steps and corresponding functions in support of disclosed structural means, can also be utilized to implement corresponding software structures and algorithms, and equivalents thereof.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art can effect alterations, modifications and variations to the examples without departing from the scope of the invention.

What is claimed is:

1. One or more computer readable media storing instructions that are executable by a processing device, and upon such execution cause the processing device to perform operations comprising:
    quasi-randomly selecting a plurality of video items from available video items;
    generating an instance for each of the selected video items;
    defining a plurality of layers along a path in a display environment, each layer being a display position for at least two instances of the selected video items, the plurality of layers including a first layer corresponding to a foreground position and one or more successive layers corresponding to background positions with each successive layer from the first layer having an increasingly smaller scale wherein the at least two instances of the selected video items displayed in the first layer have a largest scale and the at least two instances of the selected video items displayed in a last successive layer have a smallest scale;
    concurrently transitioning instances of the selected video items along the path from the last successive layer to the first layer, wherein the transitioning includes a plurality of intermittent pauses in the transitioning, wherein each intermittent pause is a period of time during which each of the instances of the selected video items are not transitioned and are stationary along the path, and during each intermittent pause at least two instances of the selected video items are displayed in each of the first layer and the one or more successive layers during the intermittent pause; and
    after each intermittent pause, transitioning the at least two instances of the selected video items displayed in the first layer during the intermittent pause out of the display environment and transitioning at least two instances of the selected video items not displayed during the intermittent pause into the display environment for display in the last successive layer.

2. The computer readable media of claim 1, wherein a video item comprises one or more digital representations of pictures.

3. The computer readable media of claim 1, wherein a video item comprises one or more movies.

4. The computer readable media of claim 1, wherein a video item comprises one or more video clips.

5. The computer readable media of claim 1, wherein display positions for displaying the instances of the selected video items are overlapped in the display environment.

6. The computer readable media of claim 1, wherein the display environment is at least one of a screen saver, a slideshow viewer, or a library viewer.

7. The computer readable media of claim 1, wherein the video items are retrieved from a data store.

8. The computer readable media of claim 1, wherein the video items comprise digital representations of media content retrieved through a network interface.

9. The computer readable media of claim 1, wherein the display environment is configured to render the selecting, generating, scaling and concurrent transitioning of the instances of the selected video items in real time.

10. A method comprising:
    quasi-randomly selecting a plurality of video items from available video items;
    generating instances for each of the selected video items;
    defining a plurality of layers along a path in a display environment, each layer being a display position for at least two instances of the selected video items, the plurality of layers including a first layer corresponding to a foreground position and one or more successive layers corresponding to background positions with each successive layer from the first layer having an increasingly smaller scale wherein the at least two instances of the selected video items displayed in the first layer have a largest scale and the at least two instances of the selected video items displayed in a last successive layer have a smallest scale; and
    concurrently transitioning instances of the selected video items along the path from the last successive layer to the first layer, wherein the transitioning includes a plurality of intermittent pauses in the transitioning, wherein each intermittent pause is a period of time during which each of the instances of the selected video items are not transitioned and are stationary along the path, and during each intermittent pause at least two instances of the selected video items are displayed in each of the first layer and the one or more successive layers during the intermittent pause; and
    after each intermittent pause, transitioning the at least two instances of the selected video items displayed in the first layer during the intermittent pause out of the display environment and transitioning at least two instances of the selected video items not displayed during the intermittent pause into the display environment for display in the last successive layer.

11. The method of claim 10, wherein a video item comprises one or more digital representations of pictures, one or more movies, one or more video clips, or combinations thereof.

12. The method of claim 10, further comprising presenting music in the display environment.

13. The method of claim 10, wherein display positions for displaying instances of the selected video items are overlapped in the display environment.

14. The method of claim 10, wherein the display environment is at least one of a screen saver, a slideshow viewer, or a library viewer.

15. The method of claim 10, wherein the video items are retrieved from a data store.

16. The method of claim 10, wherein the video items comprise digital representations of media content retrieved through a network interface.

17. A system, comprising:
a data store configured to store video items;
a media processing system in data communication with the data store and configured to:
retrieve video items from the data store;
quasi-randomly select a plurality of the video items;
generate an instance for each of the selected video items;
define a plurality of layers along a path in a display environment, each layer being a display position for at least two instances of the selected video items, the plurality of layers including a first layer corresponding to a foreground position and one or more successive layers corresponding to background positions with each successive layer from the first layer having an increasingly smaller scale wherein the at least two instances of the selected video items displayed in the first layer have a largest scale and the at least two instances of the selected video items displayed in a last successive layer have a smallest scale; and
concurrently transition instances of the selected video items along the path from the last successive layer to the first layer, wherein the transitioning includes a plurality of intermittent pauses in the transitioning, wherein each intermittent pause is a period of time during which each of the instances of the selected video items are not transitioned and are stationary along the path, and during each intermittent pause at least two instances of the selected video items are displayed in each of the first layer and the one or more successive layers during the intermittent pause; and
after each intermittent pause, transition the at least two instances of the selected video items displayed in the first layer during the intermittent pause out of the display environment and transition at least two instances of the selected video items not displayed during the intermittent pause into the display environment for display in the last successive layer.

18. A method comprising:
quasi-randomly selecting a plurality of video items from available video items;
generating instances for each of the selected video items;
defining a plurality of layers along a path in a display environment, each layer being a display position for instances of the selected video items, the plurality of layers including a first layer corresponding to a foreground position and one or more successive layers corresponding to background positions with each successive layer from the first layer having an increasingly smaller scale, wherein the instances of the selected video items displayed in the first layer have a largest scale and the instances of the selected video items displayed in a last successive layer have a smallest scale;
concurrently transitioning instances of the selected video items between the plurality of layers, each instance of the selected video items transitioning from a layer to another layer through a bouncing movement, wherein the transitioning includes a plurality of intermittent pauses in the transitioning, wherein each intermittent pause is a period of time during which each of the instances of the selected video items are not transitioned and are stationary along the path, and during each intermittent pause instances of the selected video items are displayed in the one or more successive layers during the intermittent pause; and
after each intermittent pause, transitioning instances of the displayed selected video items out of the display environment and transitioning instances of the selected video items not displayed during the intermittent pause into the display environment for display in at least one layer.

* * * * *